(12) United States Patent
Cheng et al.

(10) Patent No.: US 8,872,701 B2
(45) Date of Patent: Oct. 28, 2014

(54) LOCATION BASED DETERMINATION TO PERFORM A RANGING PROCEDURE

(75) Inventors: Steven D. Cheng, San Diego, CA (US); Guangming Shi, San Diego, CA (US); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 13/238,566

(22) Filed: Sep. 21, 2011

(65) Prior Publication Data

US 2013/0069828 A1    Mar. 21, 2013

(51) Int. Cl.
*G01S 3/02* (2006.01)
*H04W 74/08* (2009.01)
*H04W 60/04* (2009.01)

(52) U.S. Cl.
CPC .......... *H04W 74/0891* (2013.01); *H04W 60/04* (2013.01)
USPC ....................................... 342/458

(58) Field of Classification Search
USPC ....................................... 342/458
See application file for complete search history.

(56) References Cited

U.S. PATENT DOCUMENTS

| | | | |
|---|---|---|---|
| 6,330,446 B1 | 12/2001 | Mori | |
| 7,574,230 B1 | 8/2009 | Oh et al. | |
| 7,894,829 B2 | 2/2011 | Kim | |
| 8,285,484 B1 * | 10/2012 | Lau et al. | 701/468 |
| 2006/0009240 A1 * | 1/2006 | Katz | 455/457 |
| 2006/0079244 A1 | 4/2006 | Posner et al. | |
| 2008/0224925 A1 * | 9/2008 | Ochenbauer | 342/357.1 |
| 2010/0091714 A1 | 4/2010 | Bennett | |
| 2010/0094930 A1 * | 4/2010 | Griff et al. | 709/203 |
| 2011/0130141 A1 | 6/2011 | Frost et al. | |

FOREIGN PATENT DOCUMENTS

| | | |
|---|---|---|
| EP | 2247125 A1 | 11/2010 |
| KR | 20050031747 A | 4/2005 |

OTHER PUBLICATIONS

International Search Report and Written Opinion—PCT/US2012/053988—ISA/EPO—Jan. 2, 2013.
Lim, et al., "Enhancement to the Periodic Ranging," IEEE 802.16 Broadband Wireless Access Working Group, IEEE C802.16e-04/56r2, May 17, 2004, 4 pages.

* cited by examiner

*Primary Examiner* — Harry Liu
(74) *Attorney, Agent, or Firm* — Tyler J. Overall

(57) ABSTRACT

Methods and systems are described for using location-based information to determine whether to perform a ranging procedure. A change in location of a device is identified. The identified change in location represents the distance the device has moved during an interval between ranging procedures. The identified change in location is analyzed to determine whether the change exceeds a threshold distance. If the change in location does not satisfy the threshold distance, a change in a signal quality metric of the device from the location associated with the previously performed ranging procedure to the current location is identified. The identified change in signal quality metric is analyzed to determine whether the change exceeds a threshold value. If the change in location of the device is less than the threshold distance and the change in the signal quality metric is less than the threshold value, the next scheduled ranging procedure is bypassed.

43 Claims, 14 Drawing Sheets

LOCATION BASED DETERMINATION TO PERFORM A RANGING PROCEDURE

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communications system may include a number of base stations, each simultaneously supporting communication for multiple mobile terminals. Base stations may communicate with mobile terminals on downstream and upstream links. Each base station has a coverage range, which may be referred to as the coverage area of the cell. Mobile stations desiring to enter the coverage area of a base station may initiate contact to establish communications with the base station. For example, when a mobile station desires to enter the coverage area of a base station, the mobile station may send an initial transmission to the base station. If the mobile station does not receive a response, the mobile station may increase the transmission power and retransmit the initial transmission. When the base station receives the initial transmission, it may communicate a response to the mobile station with transmission-related information that enables the mobile station and the base station to establish a communications channel.

After communications between the mobile station and the base station have been established, the mobile station may periodically transmit requests to the base station requesting updated transmission-related information. These periodic requests use battery resources of the mobile station and the receipt of such requests, and generation of responses to the requests, use bandwidth. As a result, transmitting periodic requests when it is unnecessary may waste resources, such as battery power and bandwidth, in devices in current wireless network systems.

SUMMARY

Systems, methods, and computer-readable products that use location-based information to determine whether to perform a ranging procedure are described. In one example, a change in location of a mobile device from a location associated with a previous ranging procedure to a current location is identified. For example, the distance is identified that the mobile device has moved since a previous ranging procedure was performed. A determination is made as to whether the change in location exceeds a threshold distance. The next scheduled ranging procedure may be bypassed based on the determination that the change in location is less than the threshold distance.

In one configuration, upon determining that the change in location is less than the threshold distance, and before bypassing the upcoming ranging procedure, a change in a signal quality metric of the mobile device may be identified. For example, a value of the signal quality metric at the time the previous ranging procedure was executed may be compared with a current value of the signal quality metric. Upon determining that that change in signal quality metric does not exceed a threshold value, the next scheduled ranging procedure may be bypassed. The ranging procedure may be performed based on a determination that the change in the signal quality metric exceeds the threshold value. The signal quality metric may include a carrier-to-noise ratio (CNR) or a signal-to-noise ratio (SNR).

In one example, an interval between ranging procedures may be modified based on the determination that the change in location is less than the threshold distance. For example, the interval between ranging procedures may be extended based on the determination that the change in location is less than the threshold distance. In addition, an interval between ranging procedures may be modified based on the determination that the change in the signal quality metric exceeds the threshold value. For example, the interval between ranging procedures may be decreased when the change in the signal quality metric exceeds the threshold value. As another example, the interval between ranging procedures may be extended when the signal quality metric is less than the threshold value. In one configuration, a ranging procedure may be performed based on the determination that the change in location exceeds the threshold distance.

In one configuration, the change in location of the device from the location associated with the previous ranging procedure may be identified via a global positioning system (GPS) receiver. In one example, a determination may be made as to whether location based signals used to determine the change in location are available. A determination may also be made as to whether a timer has expired. A change in the signal quality metric of the device from the location associated with the previous ranging procedure to the current location is identified based on a determination that the location based signals are unavailable and that the timer has expired. Further, a determination may be made as to whether the change in the signal quality metric exceeds a threshold value. The ranging procedure may be performed based on a determination that the change in the signal quality metric exceeds the threshold value.

In one example, a state of the device may be determined. An interval between ranging procedures may be modified based on the determined state of the device. In one configuration, information that indicates a location of the device when a ranging procedure request message is transmitted may be stored. In addition, signal quality metric information that indicates signal quality metric measurement information of the device when the ranging procedure request message is transmitted may also be stored.

In one configuration, the ranging procedure may include transmitting a ranging procedure request message. A ranging procedure response message may be received. At least one metric of the device may be adjusted based on the received ranging procedure response message. Examples of the at least one metric to be adjusted may include timing of a signal to be transmitted, transmission power used to transmit a signal, or a frequency offset of a signal to be transmitted by the device.

An apparatus is also described. The apparatus may include a processor and memory in electronic communication with the processor. The processor may identify a change in location of a device from a location associated with a previous ranging procedure to a current location, and determine whether the change in location exceeds a threshold distance. The processor may also bypass a ranging procedure based on a determination that the change in location is less than the threshold distance.

A system for using location-based information to determine whether to perform a ranging procedure is also described. The system may include means for identifying a change in location of a device from a location associated with a previous ranging procedure to a current location, and means for determining whether the change in location exceeds a threshold distance. The system may further include means for bypassing a ranging procedure based on a determination that the change in location is less than the threshold distance.

A computer program product including a non-transitory computer-readable medium is also described. The computer-readable medium may include code for identifying a change in location of a device from a location associated with a previous ranging procedure to a current location, and code for determining whether the change in location exceeds a threshold distance. The medium may further include code for bypassing a ranging procedure based on a determination that the change in location exceeds the threshold distance.

An apparatus to perform a ranging request with a mobile device is also described. The apparatus may include a receiver to receive a ranging procedure request from the mobile device. The ranging procedure request may be transmitted based on a determination that a change in location of the mobile device exceeds a threshold distance. The apparatus may also include a ranging calculation module, communicatively coupled with the receiver. The module may perform a ranging procedure with the mobile device. The apparatus may further include a transmitter to transmit a ranging procedure response to the mobile device. The response may include the calculated ranging measurement associated with the mobile device.

A method to perform a ranging request with a mobile device is also described. A ranging procedure request may be received from a mobile device. The ranging procedure request may be transmitted based on a determination that a change in location of the mobile device exceeds a threshold distance. A ranging procedure may be performed with the mobile device. A ranging procedure response may be transmitted to the mobile device. The response may include calculated ranging measurements associated with the mobile device.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
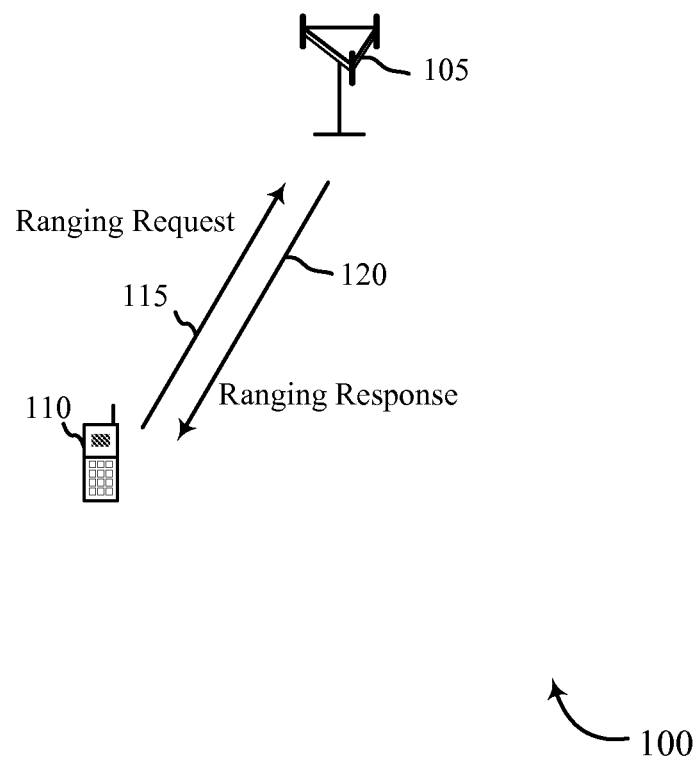
FIG. 1 shows a block diagram of a wireless communications system.

Ranging procedures may be routinely performed due to challenges caused by the spatial separation between the mobile device and the base station. These challenges may include a timing mismatch between the mobile device and the base station as well as a power mismatch between the mobile device and the base station. For example, multiple mobile devices may transmit signals to the same base station from many different locations, resulting in different propagation times for the signals transmitted by the multiple mobile devices. By implementing ranging techniques, the different propagation times may be taken into account and each mobile device may be delayed individually so that when the signals from each mobile device arrive at the base station, they are received at the base station on the time slots allocated to each mobile device. In addition to adjusting timing offsets, ranging procedures may also be used to allow the mobile device to adjust its transmission power levels so that signals arriving at the base station from multiple mobile devices arrive at similar power levels.

Ranging procedures may be carried out to maintain the quality of an existing connection between a mobile device and a base station. These procedures may be scheduled to occur at regular intervals. In one example, the described methods, systems, and computer-program products use location-based information and signal quality metric information of the mobile device to determine whether to execute a ranging procedure at the scheduled time. The decision may be based on the change of location of the mobile device. For example, a change in location of the mobile device since the previous ranging procedure may be identified. The identified change in location may be analyzed to determine whether the change exceeds a threshold distance. A determination may be made as to whether the distance the mobile has moved since the last ranging procedure was performed satisfies the threshold. If the change in location of the mobile device is less than the threshold distance, the ranging procedure may be bypassed. In other words, if the distance moved by the mobile device does not satisfy the threshold distance, the next scheduled ranging procedure may be bypassed.

In one example, if the change in location does not satisfy the threshold distance, the described methods, systems, and computer-program products may further identify a change in a signal quality metric of the mobile device since the previous ranging procedure was performed. If the change in the metric does not exceed a threshold value, the upcoming scheduled ranging procedure may not be performed.

In one configuration, ranging may include two procedures, initial ranging and periodic ranging. Initial ranging may be performed to allow a mobile device entering the wireless network to acquire correct transmission parameters, such as timing offset and transmission power levels, so that the mobile device may establish communications with a base station. Periodic ranging procedures may be performed to maintain the communications between the mobile device and the base station. Periodic ranging procedures may be initiated by the mobile device at scheduled intervals, as described below.

In one example, when data are not being transferred between the mobile device and the base station, the mobile device may transmit a ranging request (RNG-REQ) message to the periodic ranging area assigned in the uplink (UL) frame, as specified in the UL-MAP. The base station and the mobile device may use a timer, referred to as T4. The timer T4's value may be in the range of approximately 30 seconds to approximately 35 seconds. Mobile devices may perform a periodic ranging procedure in a cycle of T4 until either a data transfer occurs between the mobile device and the base station, or the mobile device powers down (i.e., enters a sleep state). If T4 expires when the mobile device is in the sleep state, the device may be woken up to perform the periodic ranging procedure and then return to the sleep state.

Periodic ranging procedures are currently initiated by many mobile devices at regularly scheduled intervals (i.e., each time T4 expires). In other words, the execution of periodic ranging procedures is currently a time-driven event. As a result, some ranging procedures may be performed unnecessarily. For example, performing periodic ranging procedures when the mobile device has not experienced a change of location and/or change of signal quality metrics may not be necessary to maintain communications with the base station. Thus, resources such as the battery power, processing capabilities, bandwidth, etc. may be unnecessarily used by both the mobile device and the base station. As described above, the present methods, systems, and computer-program products may use location-based information and signal quality metric information to determine whether a scheduled periodic ranging procedure is implemented or bypassed.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes a base station 105 and a mobile device 110. Of course, such a system typically includes a number of base stations 105 and mobile devices 110, with a single base station 105 and mobile device 110 illustrated in FIG. 1 for purposes of simplifying the discussion of the system 100. Base station 105 may be a macrocell, femtocell, picocell, and/or similar base station, a mobile base station, or relay node, for example.

In one configuration, an uplink (UL) 115 may carry UL transmissions from the mobile device 110 to the base station 105. In some cases, multiple ULs carry UL transmissions from the mobile device 110 to the base station 105. An example of an UL transmission may include a RNG-REQ. The RNG-REQ may initiate a ranging procedure between the mobile device 115 and the base station 110. A downlink (DL) 120 may carry DL transmissions from the base station 105 to the mobile device 110. In one example, multiple DLs 120 carry DL transmissions from the base station 105 to the mobile device 110, with acknowledgment of receipt of UL transmissions on the DLs 120 bundled and transmitted to the mobile station 110. An example of a DL transmission may include a ranging response (RNG-RSP). Each modulated signal may be sent on a different DL and may carry control information (e.g., pilot signals), overhead information, data, etc.

The base station 105 may wirelessly communicate with the mobile device 110 via one or more base station antenna(s). The base station 105 may provide communication coverage for a particular geographic area, with other base stations 105 that may provide coverage for different geographic areas. A number of mobile devices 110 may be dispersed throughout the coverage area. The mobile device 110 may be a mobile station, access terminal (AT), user equipment (UE), subscriber unit, or subscriber station (SS). Such a mobile device 110 may include a cellular phone and wireless communications device, but may also include a personal digital assistant (PDA), smartphone, other handheld device, netbook, notebook computer, tablet computer, etc.

For the discussion, it may be assumed that mobile device 110 is initially operating on (is "camped on") base station 105. As the mobile device 110 moves throughout the geographic area, the channel conditions of the UL 115 and DL 120 channels may vary. For example, at the edge of the geographic coverage area, channel conditions for the UL 115 may result in the mobile device 110 approaching a limitation on the amount of power that may be provided for UL transmission. Of course, such conditions may occur at other locations within a service area of a base station 105. When the mobile device 110 approaches the edge of the coverage area of the base station 105, the device 110 may implement an initial ranging procedure with a base station to establish a new connection with that base station. Once a connection has been established with the target base station, the mobile device 110 may implement periodic ranging procedures to maintain the connection with the new base station.

The mobile device 110 may include an architecture that allows it to analyze certain changes experienced by the mobile device 110 since the last periodic ranging procedure was performed to determine whether to perform the next periodic ranging procedure at the scheduled time. If these changes do not satisfy a threshold, the mobile device 110 may bypass the next scheduled period ranging procedure. Thus, the architecture may preserve resources of the mobile device 110 and the base station 105 by determining whether it is necessary to perform a periodic ranging procedure at the scheduled time.

Figure 2:
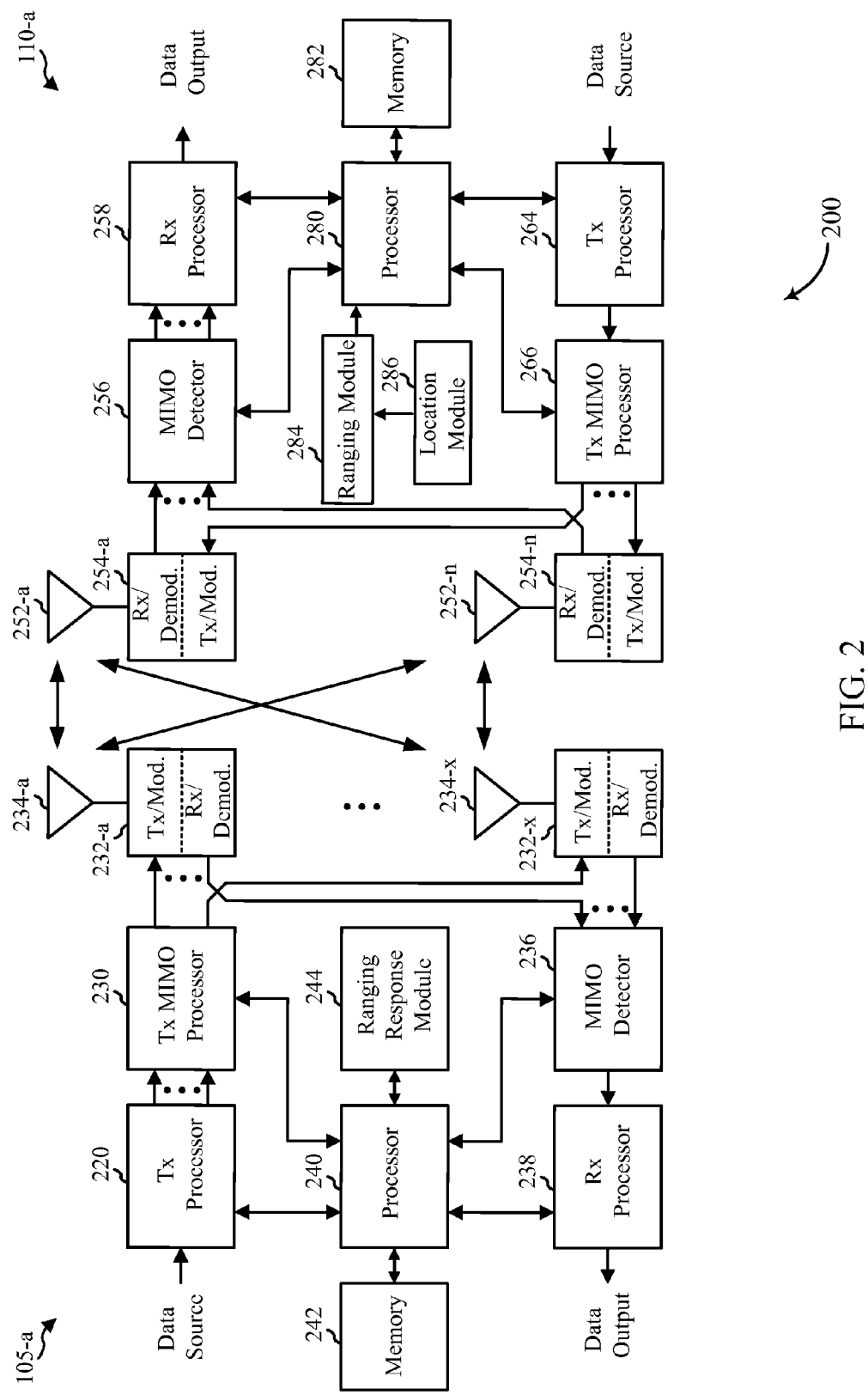
FIG. 2 shows a block diagram of the wireless communication system including a base station and a mobile device.

FIG. 2 is a block diagram of a system 200 including a base station 105-a and a mobile device 110-a. This system 200 may be an example of the system 100 of FIG. 1. The base station 105-a may be equipped with antennas 234-a through 234-x, and the mobile device 110-a may be equipped with antennas 252-a through 252-n. At the base station 105-a, a transmit processor 220 may receive data from a data source and ranging information from a processor 240, memory 242, and ranging response module 244. The ranging information may be determined by the ranging response module 244. In one example, the ranging information may be intended for the mobile device 110-a. The information may include adjustments to certain transmission parameters of the device 110-a. The transmission parameters may include power transmission levels, timing offsets, and the like.

The transmit processor 220 may process the data and ranging information. The transmit processor 220 may also generate reference symbols, and a cell-specific reference signal. A transmit (TX) multiple-input multiple-output (MIMO) processor 230 may perform spatial processing (e.g., precoding) on data symbols, control symbols, and/or reference symbols, if applicable, and may provide output symbol streams to the transmit modulators 232-a through 232-x. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a DL signal. In one example, DL signals from modulators 232-a through 232-x may be transmitted via the antennas 234-a through 234-x, respectively.

At the mobile device 110-a, the mobile device antennas 252-a through 252-n may receive the DL signals from the base station 105-a and may provide the received signals to the demodulators 254-a through 254-n, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive processor 258 may process (e.g., demodulate, deinterleave, and decode) the detected symbols, providing decoded data for the mobile device 110-a to a data output, and provide decoded control information to a processor 280, or memory 282.

The mobile device 110-a may include a location module 286 that may determine current information about the mobile device 110-a. For example, the module 286 may determine the current location of the device 110-a as well as a current value of a signal quality metric of the device 110-a. In one configuration, the location module 286 may compare the current information with past information to determine delta information. For example, the module 286 may compare the current location of the mobile device 110-a with a past location to determine the change in location of the device 110-a. The location module 286 may also compare the current value of the signal quality metric with a past value of the signal quality metric to determine the change in value. The results of the comparison may be used by the location module 286 to instruct a ranging module 284 whether to initiate a ranging procedure with the base station 105-a.

On the UL, at the mobile device 110-a, a transmit processor 264 may receive and process data from a data source and a RNG-REQ from the processor 280 and the ranging module 284 (if it is determined to perform the ranging procedure). The transmit processor 264 may also generate reference symbols for a reference signal. The symbols from the transmit processor 264 may be precoded by a transmit MIMO processor 266 if applicable, further processed by the demodulators 254-a through 254-n (e.g., for SC-FDMA, etc.), and be transmitted to the base station 105-a in accordance with the transmission parameters received from the base station 105-a. At the base station 105-a, the UL signals from the mobile device 110-a may be received by the antennas 234, processed by the demodulators 232, detected by a MIMO detector 236 if applicable, and further processed by a receive processor. The receive processor 238 may provide decoded data to a data output and to the processor 240. In one example, the ranging response module 244 may receive the RNG-REQ, generate a RNG-RSP, and transmit the RNG-RSP to the mobile station 110-a in accordance with the execution of a ranging procedure.

Figure 3:
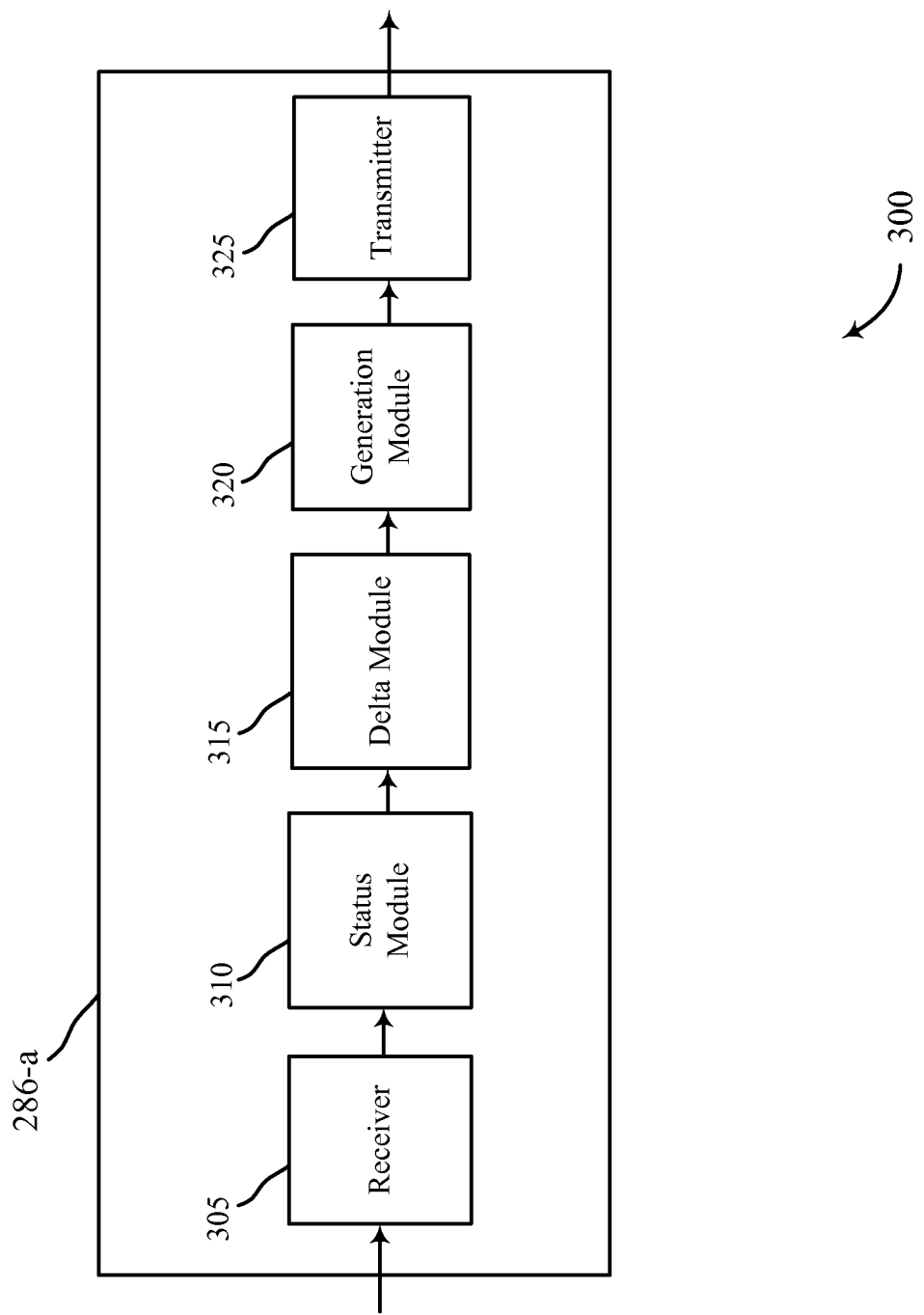
FIG. 3 shows a block diagram of one example of a location module.

FIG. 3 is a block diagram 300 illustrating one example of a location module 286. The location module 286 may be an example of the location module 286 located in the mobile device 110-a of FIG. 2, or may be an example of the mobile device 110 of FIG. 1. The module 286 may include a receiver 305, a status module 310, a delta module 315, a generation module 320, and a transmitter 325. The receiver 305 may receive data relating to certain characteristics of the mobile device 110-a. The status module 310 may use this data to determine current status information (e.g., current location and/or signal quality) of the mobile device 110-a. The delta module 315 may determine delta information by comparing the current status information with past status information (e.g., past location or previous signal quality) of the device 110-a. The generation module 320 may generate instructions, based on the determined delta information, regarding ranging procedure that is scheduled to be performed. For example, a change in location of a mobile device since a previous ranging procedure may be identified. If the change in location does not exceed a threshold distance, the next scheduled ranging procedure may be bypassed by the generation module 320. In one configuration, upon determining that the change in location is less than the threshold distance, and before bypassing the upcoming ranging procedure, a change in a signal quality metric of the mobile device may be identified by the generation module 320. Upon determining that that change in signal quality metric does not exceed a threshold value, the next scheduled ranging procedure may be bypassed by the generation module 320. The transmitter 325 may transmit the generated instructions to the ranging module 284, such as the ranging module 284 illustrated in FIG. 2. The ranging module 284 may handle the ranging procedure in accordance with the received instructions. Further details regarding the functions and processes implemented by the location module 286 will be discussed below.

Figure 4A:
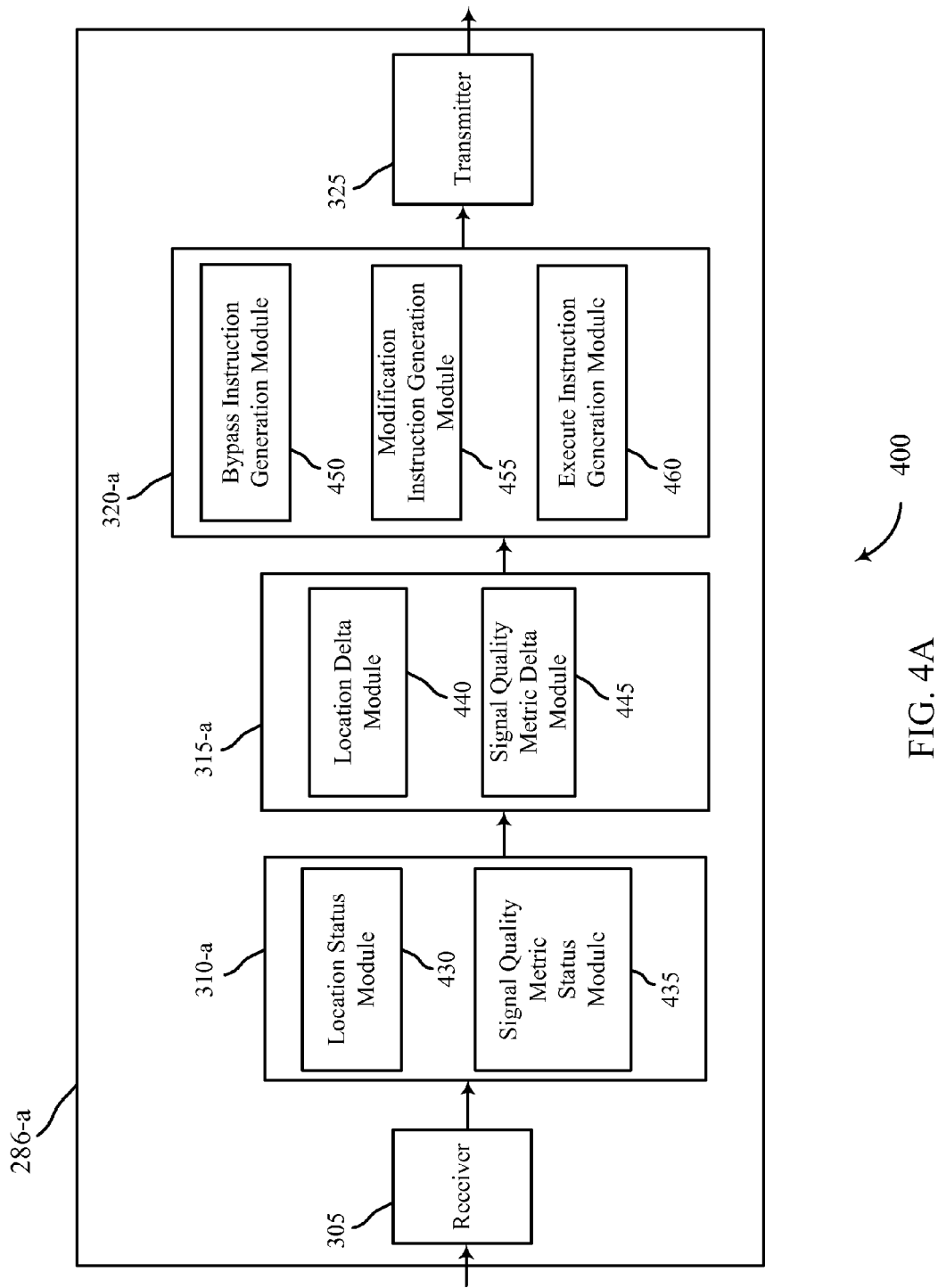
FIG. 4A shows a block diagram of a further example of the location module.

FIG. 4A is a block diagram illustrating a further example of the location module 286-a, which may be an example of the location module 286 illustrated in FIG. 2 or 3. As previously described, the location module 286-a may include a receiver 305, a status module 310-a, a delta module 315-a, a generation module 320-a, and a transmitter 325. The receiver 305 may receive location-based information and signal quality metric information. For example, the receiver 305 may be a Global Positioning System (GPS) receiver that collects information relating to the current location of mobile device (e.g., assume, for purposes of example only, that the location module is implemented in mobile device 110-a). In one configuration, location-based information may not be available. For example, the mobile device 110-*a* may not be in the line of sight (LOS) of the receiver 305, such as a GPS receiver, and the receiver 305 may be unable to collect information relating to the current location of the device 110-*a*. In one configuration, the receiver 305 may continue to attempt to collect the location information until a timer expires. When the timer expires, and upon determining that the location-based information is not available, the receiver 305 may proceed to receive information relating to one or more signal quality metrics of the mobile device 110-*a*. For example, the receiver may receive information relating to the current value of current signal quality metrics, such as carrier-to-noise ratio (CNR), signal-to-noise ratio (SNR) information, etc.

In one configuration, the status module 310-*a* may include a location status module 430 and a signal quality metric status module 435. The location status module 430 may receive the location-based information (if it is available) from the receiver 305 and determine the current location of the mobile device 110-*a* based on the received information. The signal quality metric status module 435 may receive the signal quality metric information and determine the current value of a signal quality metric of the mobile device 110-*a*.

In one example, the delta module 315-*a* may include a location delta module 440 and a signal quality metric delta module 445. The location delta module 440 may receive the current location of the mobile device 110-*a* and the signal quality metric delta module 445 may receive the current value of the signal quality metric. In one example, the location delta module 440 may compare the current location of the device 110-*a* to a previous location of the mobile device 110-*a* where a previous ranging procedure was performed. Based on the comparison, the location delta module 440 may determine a change in location of the device 110-*a*. In one example, the location delta module 440 may further determine whether the change in location exceeds a threshold distance. The signal quality delta module 445 may compare the current value of the signal quality metric to a previously recorded value of the signal quality metric that existed when the previous ranging procedure was carried out. The module 445 may determine a change in the value of the signal quality metric based on the comparison. The signal quality metric delta module 445 may further determine whether the change in the signal quality metric exceeds a threshold value. The determination reached by the location module 315-*a* regarding the change in location and the change in signal quality metric may be transmitted to the generation module 320-*a*.

In one configuration, the generation module 320 may include a bypass instruction generation module 450, a modification generation module 455, and an execute instruction generation module 460. The generation module 320 may generate instructions based on the determination of the various components of the location module 315-*a*. For example, the location delta module 440 may determine that the change in location of the mobile device 110-*a* is less than a threshold distance. In addition, the signal quality metric delta module 445 may determine that the change in the value of the signal quality metric does not exceed a threshold value. As a result, the bypass instruction generation module 450 may generate a bypass instruction that indicates that the next scheduled periodic ranging procedure is to be bypassed or skipped.

In another example, the change in location of the mobile device 110-*a* may exceed the threshold distance. Or, the change in the value of the signal quality metric may satisfy the threshold value. In one configuration, the execute instruction generation module 460 may generate an execute instruction that indicates that the mobile device 110-*a* is to initiate the next scheduled periodic ranging procedure.

In one embodiment, the modification instruction generation module 455 may generate a modification instruction based on whether a bypass instruction or an execute instruction was generated. The modification instruction may indicate that the interval of time between periodic ranging procedures is to be modified.

In one example, the transmitter 325 may transmit the generated instructions. For example, the transmitter 325 may transmit the instructions to the ranging module 284. The instructions may indicate whether to bypass or execute a periodic ranging procedure as well as instructions to modify the existing interval between ranging procedures. As a result, the ranging module 284 may perform or bypass the ranging procedure and modify the interval of time between ranging procedures. The above description provides one configuration of the architecture of a mobile device 110-*a* to determine whether to execute a ranging procedure. Thus, there may be other configurations of the architecture to determine whether to bypass or perform a ranging procedure and how to modify the interval between subsequent procedures.

Figure 4B:
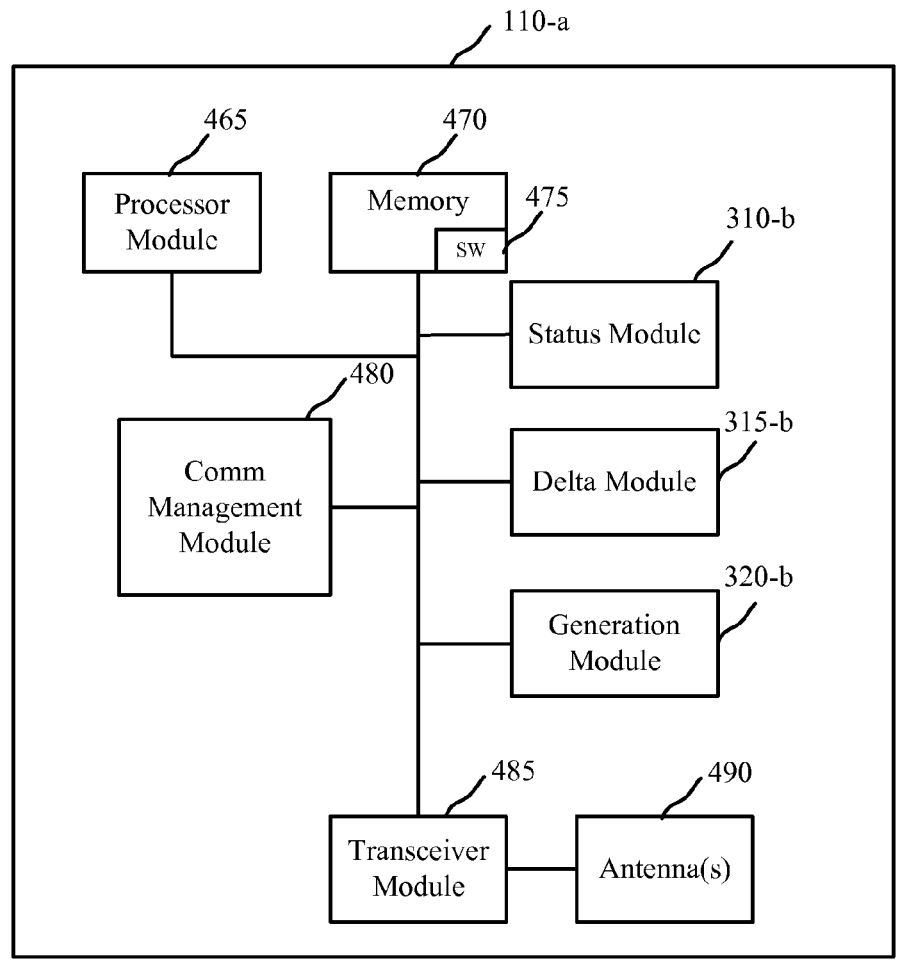
FIG. 4B shows a block diagram of an example of the mobile device.

FIG. 4B shows a block diagram 401 of a mobile device 110-*a*. The device 110-*a* may be an example of the mobile device 110-*a* of FIG. 2, which may be an example of the mobile devices 110 of FIG. 1. The mobile device 110-*a* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 110-*a* may have a mobile configuration, having an internal power supply (not shown), such as a small battery, to facilitate mobile operation.

The mobile device 110-*a* may include antennas 490, a transceiver module 485, memory 470, a processor module 465, the status module 310-*a*, the delta module 315-*b*, and the generation module 320-*b*, which each may be in communication, directly or indirectly, with each other (e.g., via one or more buses). The processor module 465 may be an example of the processor 280 shown in FIG. 2. The status module 310-*b*, the delta module 315-*b*, and the generation module 320-*b* may be examples of the modules of FIG. 3 and FIG. 4A. In one example, the transceiver module 485 may communicate bi-directionally, via the antennas 490 and/or one or more wired or wireless links, with one or more networks, as described above. For example, the transceiver module 485 is configured to communicate bi-directionally with base stations 105 of the wireless communications network (e.g., the communications network 100 of FIG. 1.

As generally referenced above, the status module 310-*b* may determine current status information of the mobile device 110-*a*. For example, the status module 310-*a* may determine the current location and the current value of a signal quality metric of the mobile device 110-*a*. In one configuration, the delta module 315-*b* may determine a change in the location and a change in the signal quality metric of the mobile device 110-*a*. The generation module 320-*b* may generate instructions relating to performing or bypassing a period ranging procedure based on the determined changes of the mobile device 110-*a*. In one embodiment, the transceiver module 485 may transmit the generated instructed to the ranging module 286-*a* via the antennas 490. The ranging module 286-*a* may execute or bypass the ranging procedure based on the received instructions.

In addition to generating bypass or executing instructions, the generation module 320-*b* may generate instructions to modify the interval between subsequent ranging procedures. For example, the interval between times to perform periodic ranging procedures may be increased if the bypass instruction is generated. Similarly, the interval may be decreased if the execute instruction is generated. Thus, when a current ranging procedure is executed at its scheduled time slot, the interval of time until the next ranging procedure is to be initiated may be reduced. In other words, the time until the mobile device 110-*a* determines whether to execute or bypass the next scheduled ranging procedure occurs at an earlier time slot. Likewise, when the current ranging procedure is bypassed at its scheduled time slot, the interval of time until the next ranging procedure is to be initiated may be increased. As a result, the time until the mobile device 110-*a* determines whether to execute or bypass the next scheduled ranging may occur at a later time slot.

The memory 470 may include random access memory (RAM) and read-only memory (ROM). The memory 470 may store computer-readable, computer-executable software code 475 including instructions that, when executed, may cause the processor module 465 to perform various functions described herein (e.g., ranging procedures). Alternatively, the software 475 may not be directly executable by the processor module 465 but may cause the computer, (e.g., when compiled and executed), to perform functions described herein. For example, the instructions may cause the processor module 465 to identify a change in the status of the device 110-*a* since a previous ranging procedure was performed. The instructions may also cause the processor module 465 to determine whether the change in the status exceeds a threshold. If the change in the status is less than the threshold, the processor module 465 may bypass or skip the ranging procedure scheduled to occur.

The processor module 465 may include an intelligent hardware device, (e.g., a central processing unit (CPU) such as those made by Intel® Corporation or AMD®), a microcontroller, an application specific integrated circuit (ASIC), etc. The processor module 465 may include a speech encoder (not shown) configured to receive audio via a microphone, convert the audio into packets (e.g., 30 ms in length) representative of the received audio, provide the audio packets to the transceiver module 485, and provide indications of whether a user is speaking. Alternatively, an encoder may only provide packets to the transceiver module 485, with the provision or withholding/suppression of the packet itself providing the indication of whether a user is speaking.

According to the architecture of FIG. 4B, the mobile device 110-*a* may further include a communications management subsystem 480. The communications management subsystem 480 may manage communications with a wireless communications network (e.g., WWAN), other mobile devices 110, etc. For example, the communications management subsystem 480 may be a component of the mobile device 110-*a* in communication with some or all of the other components of the mobile device 110-*a* via a bus. Alternatively, functionality of the communications management subsystem 480 may be implemented as a component of the transceiver module 485, as a computer program product, and/or as one or more controller elements of the processor module 465.

Figure 5:
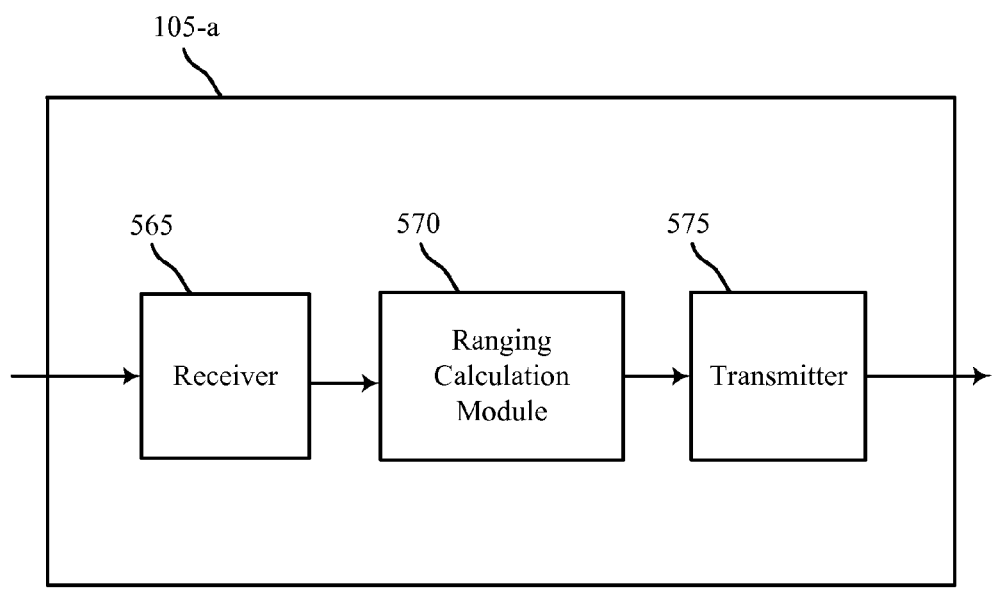
FIG. 5 shows a block diagram of an example of the base station.

Referring now to FIG. 5, a block diagram 500 of a base station 105-*a* is provided. The base station 105-*a* may be an example of the base stations 105-*a* of FIG. 2, which may be an example of the base station 105 of FIG. 1. The base station 105-*a* may include an architecture to allow the base station 105-*a* to perform a ranging procedure with a mobile device 110-*a*. The architecture of the base station 105-*a* may include a receiver 565, a ranging calculation module 570, and a transmitter 575. In one example, the receiver 565 may receive a ranging procedure request from the mobile device 110-*a*. For example, the ranging procedure request may be transmitted by the mobile device 110-*a* based on a determination that a change in the location or a change in a signal quality metric of the mobile device 110-*a* exceeds a threshold.

In one example, the ranging calculation module 570 may be communicatively coupled with the receiver 565. The module 570 may calculate ranging measurements. The ranging measurements may include adjustments to the transmission power levels, timing offsets, etc. of the mobile device 110-*a*. The transmitter 575 may transmit a ranging procedure response to the mobile device 110-*a*. The response may include the calculated ranging measurements. The mobile device 110-*a* may adjust various parameters (e.g., transmission power levels, timing offset, etc.) based on the received ranging measurements.

Figure 6:
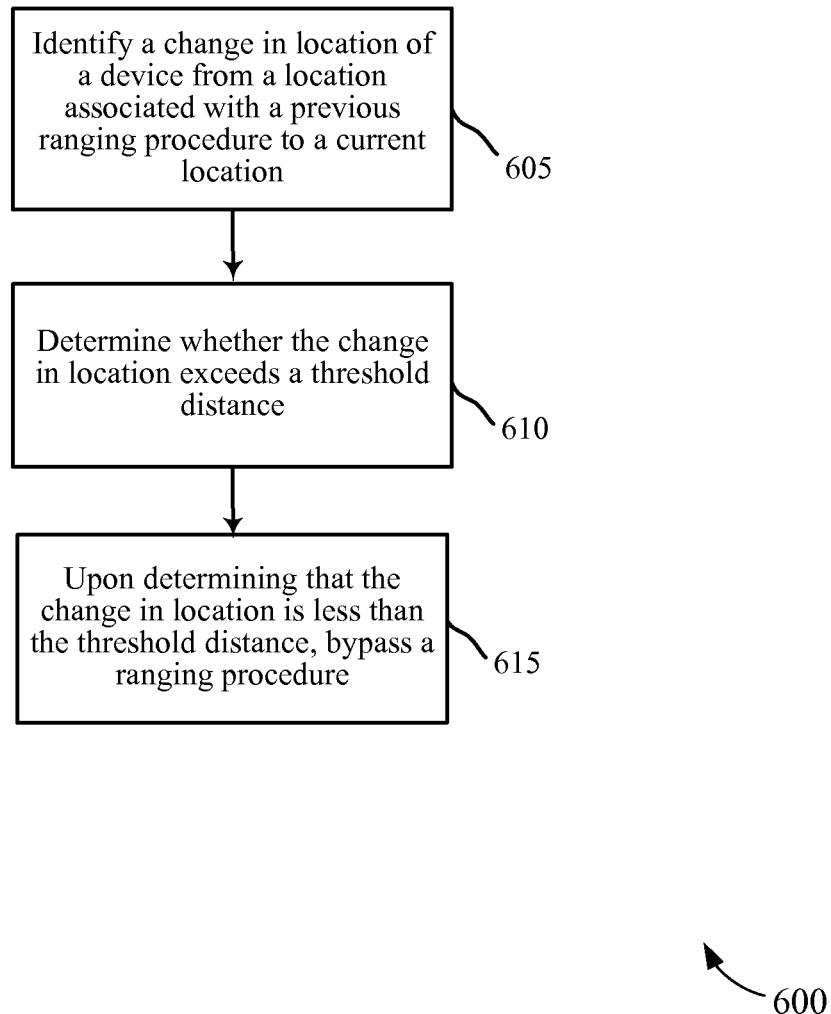
FIG. 6 is a flow chart of a method to use location-based information to determine whether to execute a ranging procedure by a mobile device.

FIG. 6 is a flow chart illustrating one configuration of a method 600 to use location-based information to determine whether to execute a ranging procedure. The method 600 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

At block 605, a change in location of the mobile device 110-*a* from a location associated with a previous ranging procedure to a current location may be identified. For example, a distance value representing the distance the mobile device 110-*a* has moved since the execution of the previous ranging request may be identified. At block 610, a determination may be made as to whether the change in location exceeds a threshold distance. If it is determined that the change in location is less than the threshold distance, the ranging procedure may be bypassed at block 615. In other words, if the mobile device 110-*a* has not moved a distance that exceeds the threshold distance during an interval of time since the previous ranging procedure was performed, the next scheduled ranging procedure may be bypassed.

Thus, the method 600 may provide for using location-based information to determine whether to execute a ranging procedure. It should be noted that the method 600 is just one implementation and that the operations of the method 600 may be rearranged or otherwise modified such that other implementations are possible.

Figure 7:
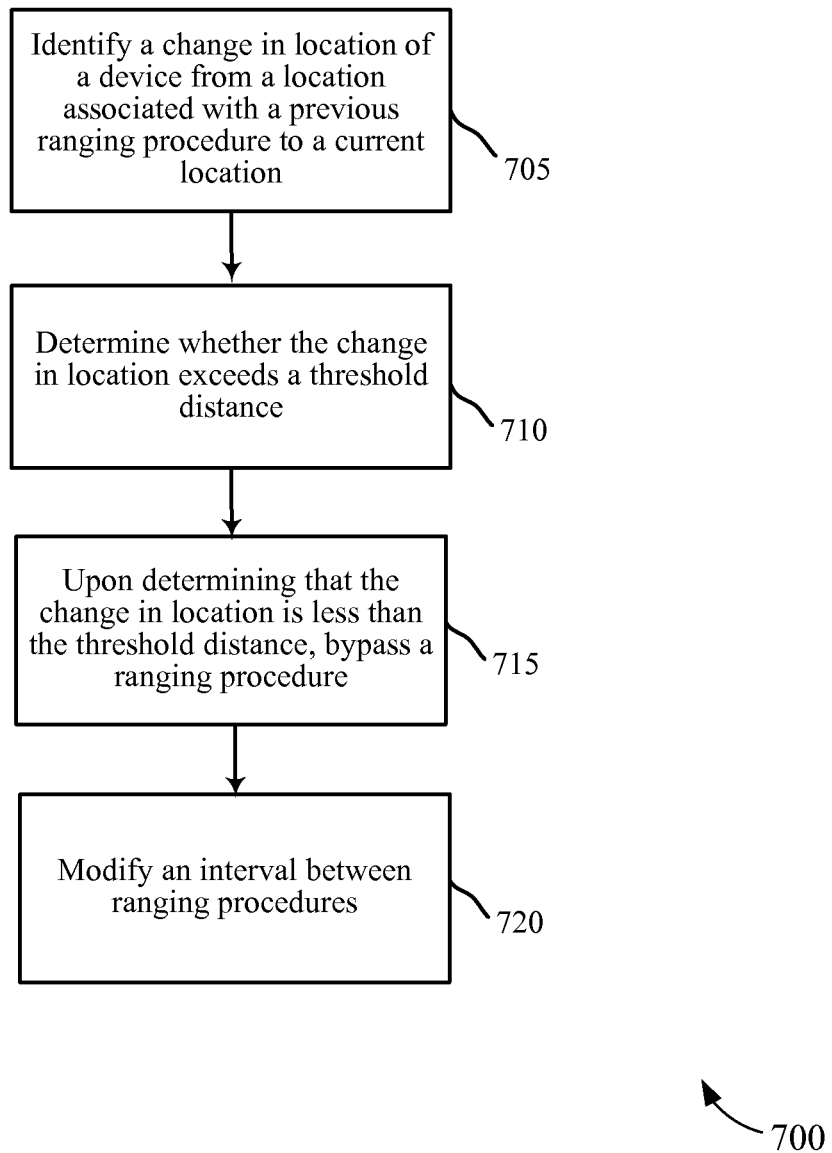
FIG. 7 is a flow chart of a method to determine whether to modify an interval between subsequent ranging procedures.

FIG. 7 is a flow chart illustrating one example of a method 700 to determine whether to modify an interval between subsequent ranging procedures. The method 700 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

At block 705, a change in location of the mobile device 110-*a* may be identified, as previously described. At block 710, a determination may be made as to whether the change in location exceeds a threshold distance, as previously described. If it is determined that the change in location is less than the threshold distance, at block 715, the execution of the next scheduled ranging procedure may be bypassed. In one configuration, the interval between ranging procedures may be modified 720. For example, the interval may be increased so that the time for the next scheduled periodic ranging procedure may be extended. Alternatively, the interval may be shortened, thus decreased the interval of time between subsequent periodic ranging procedures.

Thus, the method 700 may provide for using location-based information to modify an interval of time between ranging procedures. It should be noted that the method 700 is just one implementation and that the operations of the method 700 may be rearranged or otherwise modified such that other implementations are possible.

Figure 8:
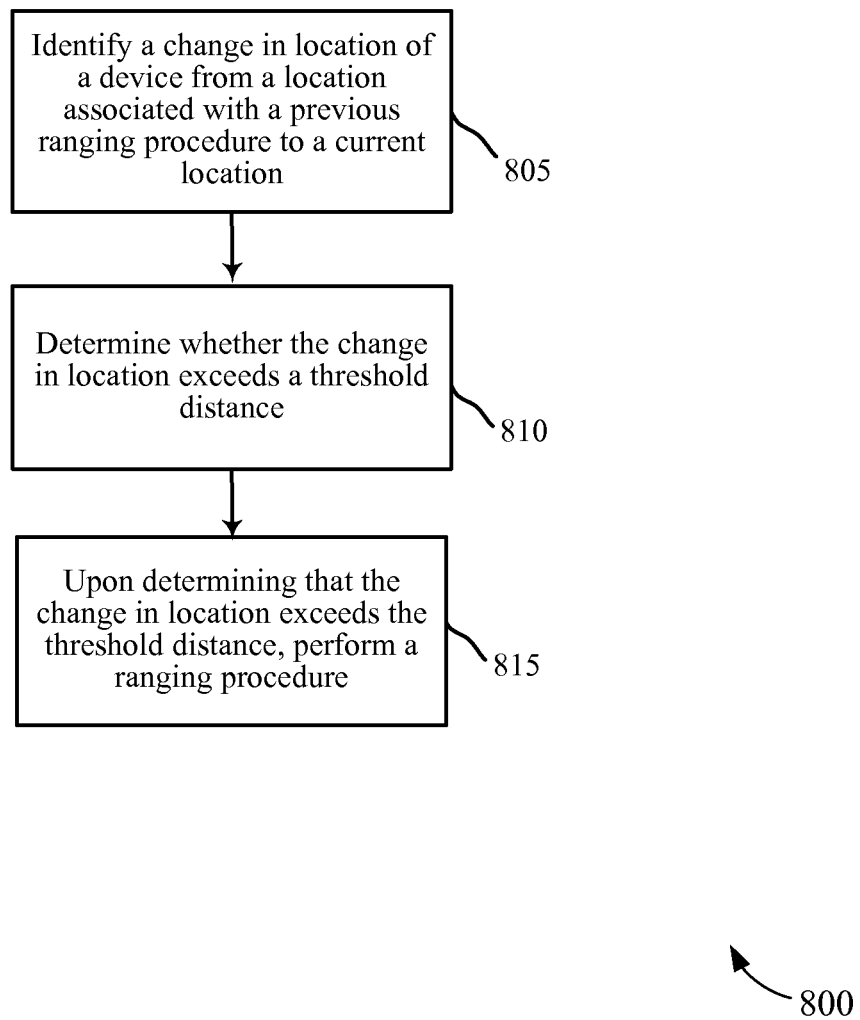
FIG. 8 is a flow chart of a further example of a method to use location-based information to determine whether to perform a ranging procedure by the mobile device.

FIG. 8 is a flow chart illustrating a further configuration of a method 800 to use location-based information to determine whether to perform a ranging procedure by the mobile device 110-*a*. The method 800 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

In one example, at block 805, a change in location of the mobile device 110-*a* may be identified. At block 810, a determination may be made as to whether the change in location exceeds a threshold distance. If it is determined that the change in location exceeds the threshold distance, at block 815, the next scheduled ranging procedure may be performed. For example, after a previous ranging procedure is performed, the mobile device 110-*a* may move a distance that exceeds the threshold distance. As a result, when the interval of time expires after the previous ranging procedure is performed, another ranging procedure may be initiated by the mobile device 110-*a*. The movement of the device 110-*a* beyond the threshold distance indicates that the mobile device 110-*a* may need to adjust certain transmission parameters, such as transmission power levels, timing offsets, etc. Thus, the next scheduled periodic ranging procedure is executed to allow the mobile device 110-*a* to receive the measurements from the base station 105-*a* indicating the adjustments to these parameters.

As described above, the method 800 may provide for using location-based information to determine whether to execute a ranging procedure. It should be noted that the method 800 is just one implementation and that the operations of the method 800 may be rearranged or otherwise modified such that other implementations are possible.

Figure 9:
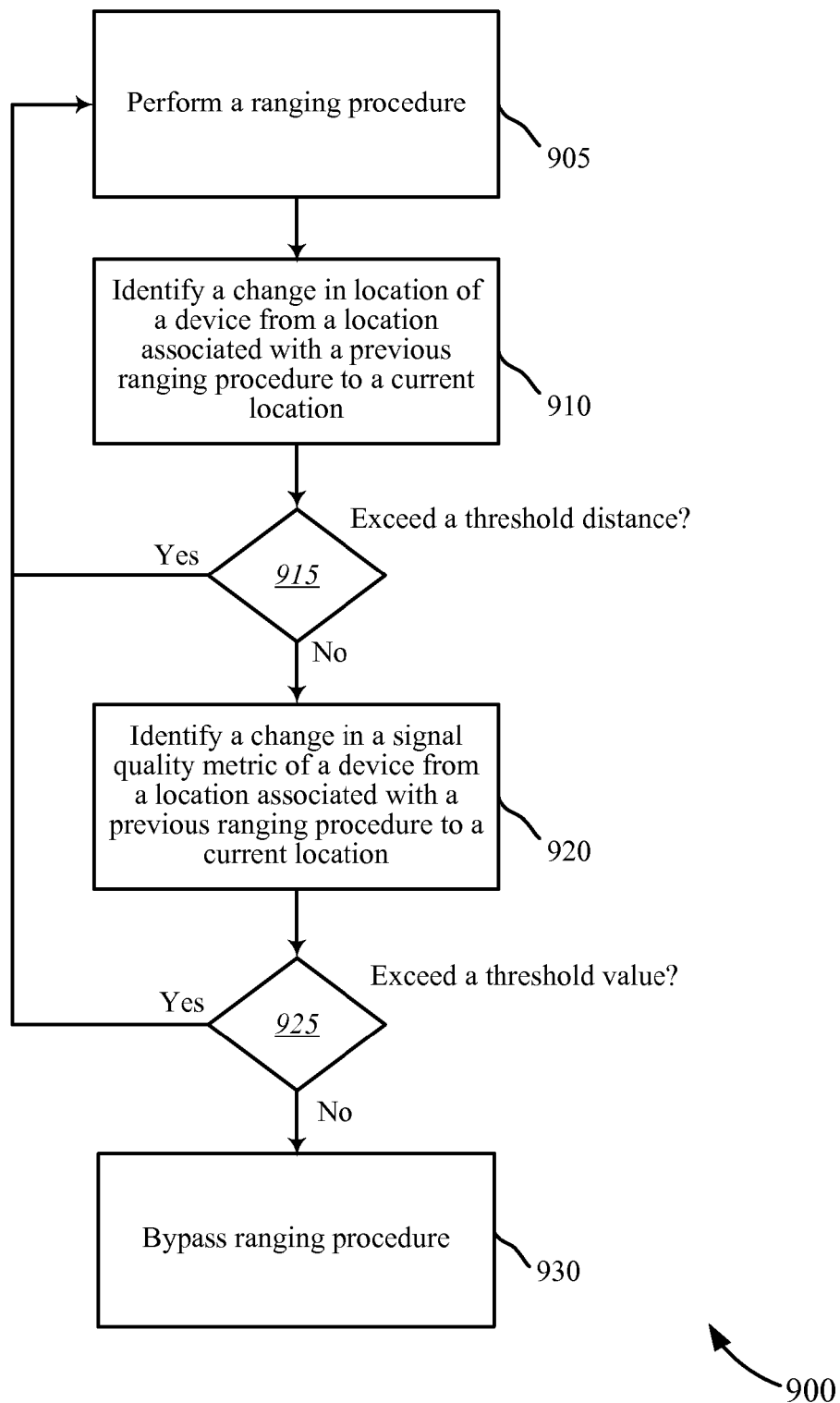
FIG. 9 is a flow chart of a method to use location-based information and signal quality metric based information to determine whether to perform a ranging procedure by the mobile device.

FIG. 9 is a flow chart illustrating one example of a method 900 to use location-based information and signal quality metric based information to determine whether to perform a ranging procedure by the mobile device 110-*a*. The method 900 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

At block 905, a ranging procedure may be performed while the mobile device 110-*a* is at a first location. For example, a ranging procedure request may be transmitted from the mobile device 110-*a* to a base station 105-*a*, such as the base station 105-*a* from FIG. 5, which is an example of the base station 105-*a* of FIG. 2, which is an example of the base station 105-*a* of FIG. 1. The base station 105-*a* may receive the request and calculate ranging measurements that may include changes to the timing offsets, transmission power levels, etc. of the mobile device 105-*a*. The base station 105-*a* may transmit a ranging procedure response to the mobile station 110-*a* that includes the ranging measurements. Information identifying the first location of the mobile device 110-*a* may be stored in the memory of the device 110-*a* when the ranging procedure is performed. In addition, information indicating the value of a signal quality metric is also recorded and stored when the ranging procedure is executed. If location and signal quality metric information are already stored in the memory of the mobile device 110-*a* from a previous ranging procedure, the mobile device 110-*a* may overwrite the previously stored information.

In one example, the mobile station 110-*a* may continue to transmit periodic ranging procedure requests at certain intervals of time to maintain the connection with the base station 105-*a*. In one configuration, the timer T4 may control the intervals between ranging procedures. When a ranging procedure is performed, the timer T4 may be restarted. When the timer expires, the device 110-*a* may determine whether to execute or bypass the next ranging procedure.

At block 910, the change in location of the device 110-*a* from the first location where the previous ranging procedure was performed to the current location may be identified. For example, when the timer T4 expires, the mobile device may determine the change in location by comparing the current location of the device 110-*a* with the location previously stored (i.e., the location at which the mobile device performed the most recent ranging procedure).

At block 915, a determination may be made as to whether the change in location exceeds a threshold distance. If it is determined that the change in location does exceed the threshold distance, the method 900 may return to block 905 to perform the next scheduled ranging procedure, and the timer T4 may be restarted. If, however, it is determined that the change in location does not exceed the threshold distance, at block 920, a change in a signal quality metric of the device 110-*a* from the location associated with the previous ranging procedure to the current location may be identified 920. The change may be determined by comparing the current value of the signal quality metric with the stored value of the metric that was stored when the previous ranging procedure was performed.

A determination 925 may be made as to whether the change in the signal quality metric of the device 110-*a* exceeds a threshold value. If it is determined 925 that the change in the signal quality metric of the mobile device 110-*a* exceeds the threshold value, the method 900 may return to block 905 to perform the next scheduled ranging procedure, and the timer T4 may be modified to lengthen the expiration time and the timer may be restarted. If, however, it is determined that the change in the signal quality metric of the mobile device 110-*a* does not exceed the threshold value, at block 930, the execution of the next scheduled ranging procedure may be bypassed. The timer T4 may be modified to decrease the expiration time, and the timer may then be restarted.

Thus, the method 900 may provide for using location-based information and signal quality metric based information to determine whether to perform a ranging procedure by the mobile device 110-*a*. It should be noted that the method 900 is just one implementation and that the operations of the method 900 may be rearranged or otherwise modified such that other implementations are possible.

Figure 10:
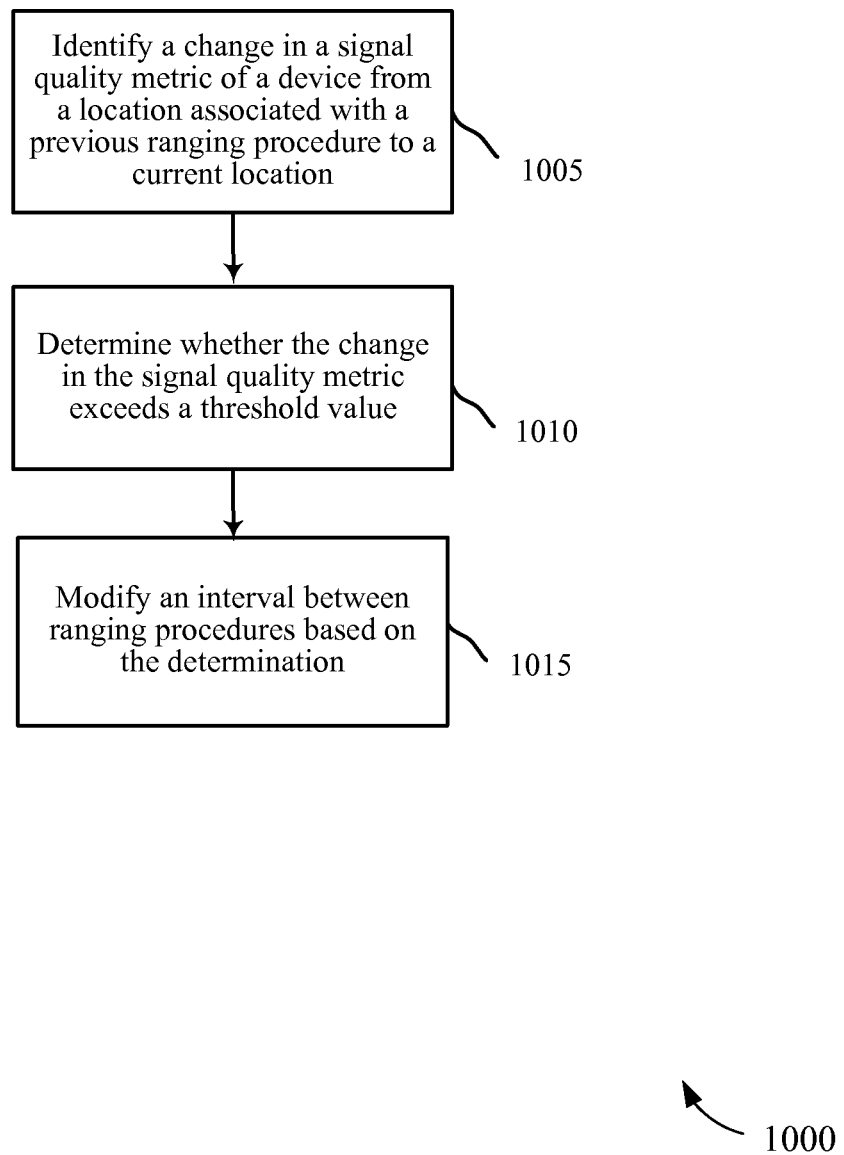
FIG. 10 is a flow chart of a method to use signal quality metric based information to determine whether to modify a ranging procedure by the mobile device.

FIG. 10 is a flow chart illustrating one example of a method 1000 to use signal quality metric based information to determine whether to modify the interval between ranging procedures. The method 1000 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

In one configuration, at block 1005, a change in a signal quality metric of the mobile device 110-*a* is identified, as described above. At block 1010, a determination may be made as to whether the change in the signal quality metric exceeds a threshold value. In one example, at block 1015, the interval between subsequent ranging procedures may be modified based on the determination.

Thus, the method 1000 may provide for using signal quality metric based information to determine whether to modify the interval between ranging procedures. It should be noted that the method 1000 is just one implementation and that the operations of the method 1000 may be rearranged or otherwise modified such that other implementations are possible.

Figure 11:
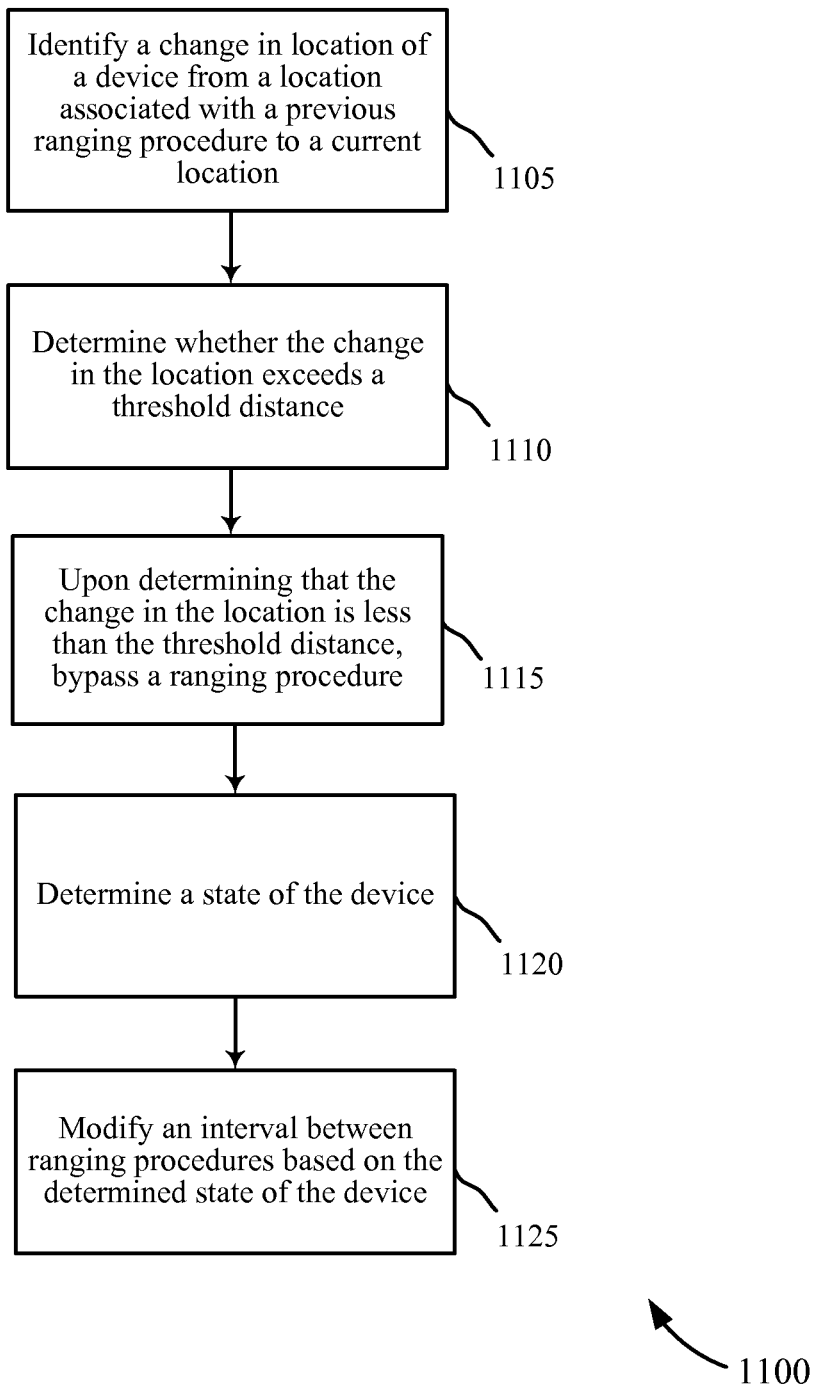
FIG. 11 is a flow chart of a method to use location-based information and state information of the mobile device to determine whether to perform ranging procedures.

Referring now to FIG. 11, a flow chart is provided illustrating one configuration of a method 1100 to use location-based information and state information of the mobile device 110-*a* to determine whether to perform ranging procedures. The method 1100 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

In one example, at block 1105, a change in location of the device 110-*a* may be identified. At block 1110, a determination may be made as to whether the change in the location exceeds a threshold distance. Upon determining that the change in the location is less than the threshold distance, at block 1115, a subsequent ranging procedure may be bypassed.

Further, at block 1120, a state of the mobile device 110-*a* may be determined. For example, it may be determined whether the device 110-*a* is in a sleep state, an active state, etc. At block 1125, an interval between subsequent ranging procedures may be modified based on the determined state of the mobile device 110-*a*. For example, if it is determined that the mobile device 110-*a* is in a sleep state, the interval between ranging procedures may be increased so as to decrease the frequency of waking up the device 110-*a* to perform a ranging procedure. In one configuration, it the mobile device 110-*a* is in an active state, the interval between subsequent ranging procedures may be decreased so as to allow the device 110-*a* to maintain the quality of an established connection with the base station 105-*a*.

Thus, the method 1100 may provide for using location-based information and state information of the mobile device 110-*a* to determine whether to perform ranging procedures is provided. It should be noted that the method 1100 is just one implementation and that the operations of the method 1100 may be rearranged or otherwise modified such that other implementations are possible.

Figure 12:
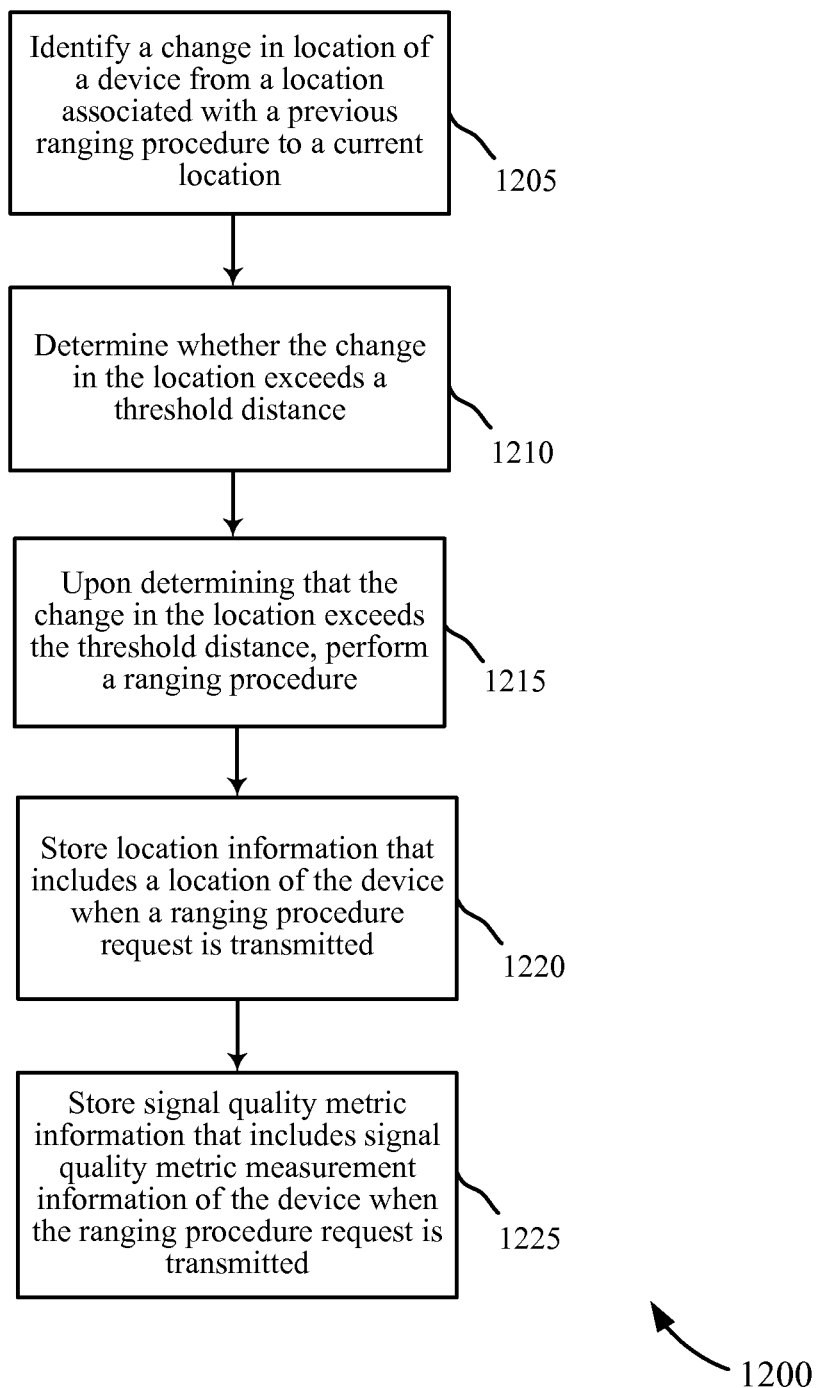
FIG. 12 is a flow chart of a method to store location-based information and signal quality metric information associated with a previous ranging procedure.

FIG. 12 is a flow chart illustrating one example of a method 1200 to store location-based information and signal quality metric information associated with a previous ranging procedure. The stored information described below may be used to determine change in location information and change in signal quality metric information as described above. The method 1200 is described below with reference to the device 110-*a* shown in FIG. 2, which is an example of the mobile device 110 shown in FIG. 1. In one implementation, the processor 280, in connection with the location module 286, may execute one or more sets of codes to control the functional elements of the device 110-*a* to perform the functions described below.

At block 1205, a change in location of a mobile device 110-*a* from a location associated with a previous ranging procedure to a current location may be identified, as previously described. At block 1210, a determination may be made as to whether the change in the location exceeds a threshold distance. If it is determined that the change in location exceeds the threshold distance, at block 1215, a ranging procedure may be performed. In one configuration, at block 1220, when the ranging procedure is perform, location information may be stored that indicates the location of the mobile device 110-*a* when the ranging procedure request was transmitted to the base station 105-*a*. In addition, at block 1225, signal quality metric information may also be stored when the ranging procedure request is transmitted. The information may include the value of the signal quality metric when the ranging procedure request is transmitted. This stored information may be used to determine delta information regarding the location and signal quality metric.

Thus, the method 1200 may provide for storing location-based information and signal quality metric information associated with the execution of a ranging procedure. It should be noted that the method 1200 is just one implementation and that the operations of the method 1200 may be rearranged or otherwise modified such that other implementations are possible.

Figure 13:
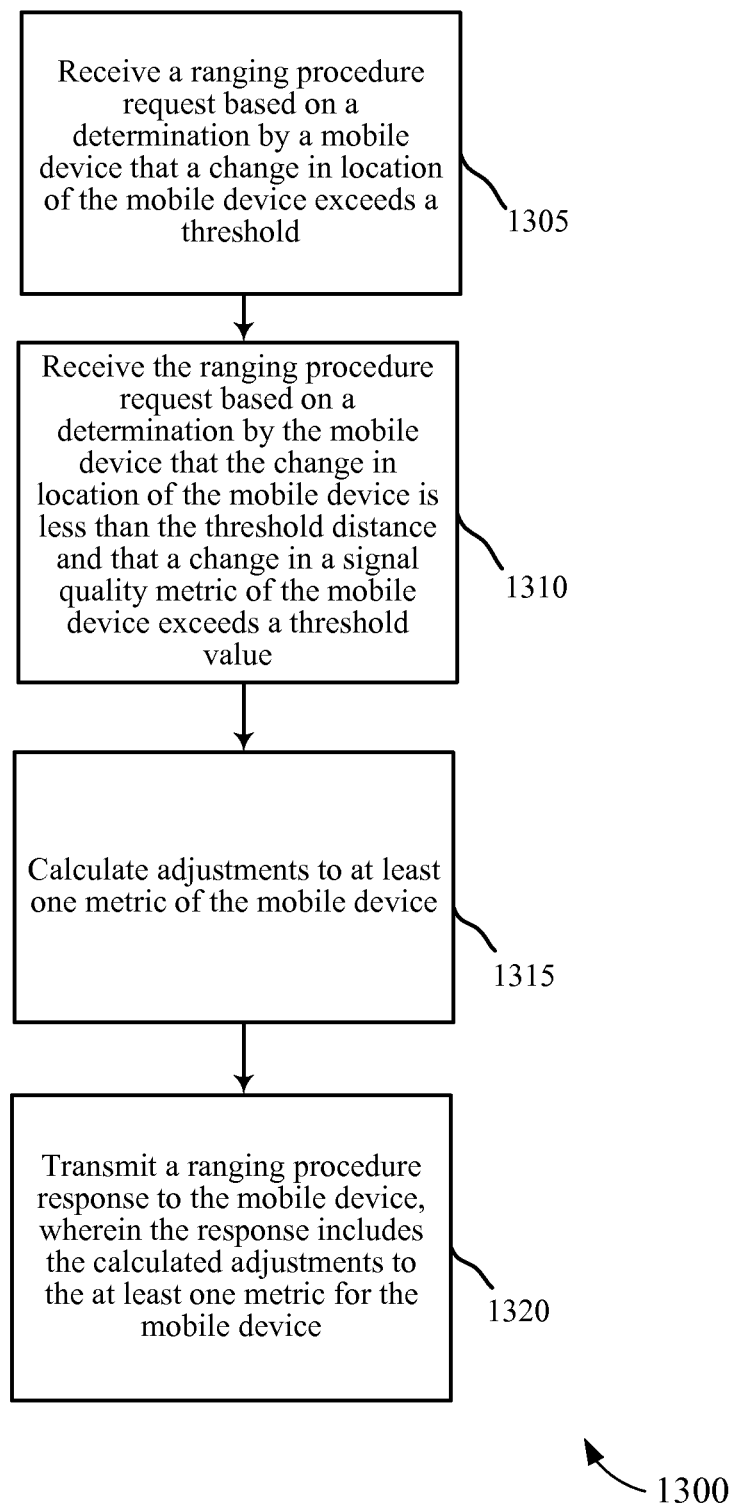
FIG. 13 is a flow chart of a method to perform a ranging procedure.

FIG. 13 is a flow chart illustrating one example of a method 1300 to perform a ranging procedure. The method 1300 is described below with reference to the base station 105-*a* shown in FIG. 5, which is an example of the base station 105-*a* shown in FIG. 2, which is an example of the base station 105 of FIG. 1. In one implementation, the processor 280, in connection with the ranging response module 244, may execute one or more sets of codes to control the functional elements of the base station 105-*a* to perform the functions described below.

In one configuration, at block 1305 a ranging procedure request may be received from a mobile device 110-*a* based on a determination by the mobile device 110-*a* that a change in location of the mobile device 110-*a* exceeds a threshold distance. As another example, at block 1310, the ranging procedure request may be received based on a determination by the mobile device 110-*a* that the change in location of the mobile device 110-*a* is less than the threshold distance and that a change in a signal quality metric of the mobile device 110-*a* exceeds a threshold value. At block 1315, adjustments to at least one parameter of the mobile device 110-*a* may be calculated. The at least one parameter may include transmission power levels, timing offsets, etc. At block 1320, a ranging procedure response may be transmitted to the mobile device 110-*a*. The response may include the adjustments to the at least one parameter for the mobile device 110-*a*. The mobile device 110-*a* may adjust the at least one parameter in accordance with the received ranging procedure response.

Thus, the method 1300 may provide for performing a ranging procedure. It should be noted that the method 1300 is just one implementation and that the operations of the method 1300 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The term "upon" used throughout this description may mean "based on", or simply "after", the later specified event. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method comprising:
   identifying a change in location of a device from a location associated with a previous ranging procedure to a current location;
   determining whether the change in location exceeds a threshold distance; and
   bypassing a subsequent scheduled ranging procedure based on a determination that the change in location is less than the threshold distance, wherein the ranging procedure comprises sending a ranging procedure request to a base station and receiving a ranging procedure response in response to the ranging procedure request.

2. The method of claim 1, further comprising:
   extending an interval between scheduled ranging procedures based on the determination that the change in location is less than the threshold distance.

3. The method of claim 1, further comprising:
   modifying an interval between scheduled ranging procedures based on the determination that the change in location is less than the threshold distance.

4. The method of claim 1, further comprising:
   performing the subsequent scheduled ranging procedure based on the determination that the change in location exceeds the threshold distance.

5. The method of claim 1, further comprising:
   identifying a change in a signal quality metric of the device from the location associated with the previous ranging procedure to the current location based on a determination that the change in location is less than the threshold distance;
   determining whether the change in the signal quality metric exceeds a threshold value; and
   performing the subsequent scheduled ranging procedure based on a determination that the change in the signal quality metric exceeds the threshold value.

6. The method of claim 5, further comprising:
   decreasing an interval between scheduled ranging procedures based on the determination that the change in the signal quality metric exceeds the threshold value.

7. The method of claim 5, further comprising:
   extending an interval between scheduled ranging procedures based on a determination that the change in the signal quality metric is less than the threshold value.

8. The method of claim 5, wherein the signal quality metric comprises a carrier-to-noise ratio (CNR) or a signal-to-noise ratio (SNR).

9. The method of claim 1, further comprising:
   identifying a change in a signal quality metric of the device from the location associated with the previous ranging procedure to the current location based on a determination that the change in location is less than the threshold distance;

determining whether the change in the signal quality metric exceeds a threshold value; and
bypassing the subsequent scheduled ranging procedure based on the determination that the change in the signal quality metric is less than the threshold value.

10. The method of claim 1, further comprising:
identifying the change in location of the device from the location associated with the previous ranging procedure via a global positioning system (GPS) receiver.

11. The method of claim 1, further comprising:
determining whether location based signals used to determine the change in location are available;
determining whether a timer has expired;
identifying a change in a signal quality metric of the device from the location associated with the previous ranging procedure to the current location based on a determination that the location based signals are unavailable and that the timer has expired;
determining whether the change in the signal quality metric exceeds a threshold value; and
performing the subsequent scheduled ranging procedure based on a determination that the change in the signal quality metric exceeds the threshold value.

12. The method of claim 1, further comprising:
determining a state of the device; and
modifying an interval between scheduled ranging procedures based on the determined state of the device.

13. The method of claim 1, further comprising:
storing location information that comprises a location of the device when a ranging procedure request message is transmitted; and
storing signal quality metric information that comprises signal quality metric measurement information of the device when the ranging procedure request message is transmitted.

14. The method of claim 1, wherein the ranging procedure comprises:
transmitting a ranging procedure request message;
receiving a ranging procedure response message; and
adjusting at least one metric based on the received ranging procedure response message.

15. The method of claim 14, wherein the at least one metric comprises timing of a signal to be transmitted, transmission power used to transmit a signal, or a frequency offset of a signal to be transmitted.

16. An apparatus, comprising:
a processor;
memory in electronic communication with the processor;
the processor configured to identify a change in location of a device from a location associated with a previous ranging procedure to a current location;
determine whether the change in location exceeds a threshold distance; and
bypass a subsequent scheduled ranging procedure based on a determination that the change in location is less than the threshold distance, wherein the ranging procedure comprises sending a ranging procedure request to a base station and receiving a ranging procedure response in response to the ranging procedure request.

17. The apparatus of claim 16, wherein the processor is further configured to:
extend an interval between scheduled ranging procedures based on the determination that the change in location is less than the threshold distance.

18. The apparatus of claim 16, wherein the processor is further configured to:
modify an interval between scheduled ranging procedures based on the determination that the change in location is less than the threshold distance.

19. The apparatus of claim 16, wherein the processor is further configured to:
perform the subsequent scheduled ranging procedure based on a determination that the change in location exceeds the threshold distance.

20. The apparatus of claim 16, wherein the processor is further configured to:
identify a change in a signal quality metric of the device from the location associated with the previous ranging procedure to the current location based on the determination that the change in location is less than the threshold distance;
determine whether the change in the signal quality metric exceeds a threshold value; and
perform the subsequent scheduled ranging procedure based on a determination that the change in signal quality metric exceeds the threshold value.

21. The apparatus of claim 20, wherein the processor is further configured to:
decrease an interval between scheduled ranging procedures based on the determination that the change in signal quality metric exceeds the threshold value.

22. The apparatus of claim 20, wherein the processor is further configured to:
extend an interval between scheduled ranging procedures based on a determination that the change in the signal quality metric is less than the threshold value.

23. The apparatus of claim 20, wherein the processor is further configured to:
bypass the subsequent scheduled ranging procedure based on the determination that the change in the signal quality metric is less than the threshold value.

24. The apparatus of claim 20, wherein the signal quality metric comprises a carrier-to-noise ratio (CNR) or a signal-to-noise ratio (SNR).

25. The apparatus of claim 16, wherein the processor is further configured to:
identify the change in location of the device from the location associated with the previous ranging procedure via a global positioning system (GPS) receiver.

26. The apparatus of claim 16, wherein the processor is further configured to:
determine whether location based signals used to determine the change in location are available;
determine whether a timer has expired;
identify a change in a signal quality metric of the device from the location associated with the previous ranging procedure to the current location based on a the determination that the location based signals are unavailable and that the timer has expired;
determine whether the change in the signal quality metric exceeds a threshold value; and
perform the subsequent scheduled ranging procedure based on a determination that the change in the signal quality metric exceeds the threshold value.

27. The apparatus of claim 16, wherein the processor is further configured to:
determine a state of the device; and
modify an interval between scheduled ranging procedures based on the determined state of the device.

28. The apparatus of claim 16, wherein the processor is further configured to:

store location information that comprises a location of the device when a ranging procedure request message is transmitted; and
store signal quality metric information that comprises signal quality metric measurement information of the device when the ranging procedure request message is transmitted.

29. A system for using location-based information to determine whether to perform a ranging procedure, the system comprising:
means for identifying a change in location of a device from a location associated with a previous ranging procedure to a current location;
means for determining whether the change in location exceeds a threshold distance; and
means for bypassing a subsequent scheduled ranging procedure based on a determination that the change in location is less than the threshold distance, wherein the ranging procedure comprises sending a ranging procedure request to a base station and receiving a ranging procedure response in response to the ranging procedure request.

30. The system of claim 29, wherein the system further comprises:
means for extending an interval between scheduled ranging procedures based on the determination that the change in location is less than the threshold distance.

31. The system of claim 29, wherein the system further comprises:
means for modifying an interval between scheduled ranging procedures based on the determination that the change in location is less than the threshold distance.

32. The system of claim 29, wherein the system further comprises:
means for performing the subsequent scheduled ranging procedure based on a determination that the change in location exceeds the threshold distance.

33. The system of claim 29, wherein the system further comprises:
means for identifying a change in a signal quality metric of the device from the location associated with the previous ranging procedure to the current location based on the determination that the change in location is less than the threshold distance;
means for determining whether the change in the signal quality metric exceeds a threshold value; and
means for performing the subsequent scheduled ranging procedure based on the determination that the change in the signal quality metric exceeds a threshold value.

34. The system of claim 33, the system further comprises:
means for decreasing an interval between scheduled ranging procedures based on the determination that the change in signal quality metric exceeds the threshold value.

35. The system of claim 33, wherein the system further comprises:
means for extending an interval between scheduled ranging procedures based on a determination that the change in the signal quality metric is less than the threshold value.

36. The system of claim 33, wherein the system further comprises:
means for bypassing the subsequent scheduled ranging procedure based on a determination that the change in the signal quality metric is less than the threshold value.

37. The system of claim 29, further comprising:
means for determining whether location based signals used to determine the change in location are available;
means for determining whether a timer has expired;
means for identifying a change in a signal quality metric of the device from the location associated with the previous ranging procedure to the current location based on the determination that the location based signals are unavailable and that the timer has expired;
means for determining whether the change in the signal quality metric exceeds a threshold value; and
means for performing the subsequent scheduled ranging procedure based on a determination that the signal quality metric exceeds a threshold value.

38. A computer program product comprising a non-transitory computer-readable medium, the computer-readable medium comprising:
code for identifying a change in location of a device from a location associated with a previous ranging procedure to a current location;
code for determining whether the change in location exceeds a threshold distance; and
code for bypassing a subsequent scheduled ranging procedure based on a determination that the change in location exceeds the threshold distance, wherein the ranging procedure comprises sending a ranging procedure request to a base station and receiving a ranging procedure response in response to the ranging procedure request.

39. An apparatus comprising:
a receiver configured to receive a ranging procedure request from a mobile device, the ranging procedure request transmitted based on a determination that a change in location of the mobile device exceeds a threshold distance;
a ranging calculation module, communicatively coupled with the receiver, and configured to calculate ranging measurements; and
a transmitter configured to transmit a ranging procedure response to the mobile device, wherein the response comprises the calculated ranging measurements associated with the mobile device; and wherein the calculated ranging measurements are used by the mobile device to determine whether to bypass a subsequent scheduled ranging procedure.

40. The apparatus of claim 39, wherein the ranging procedure request is transmitted based on a determination by the mobile device that the change in location of the mobile device is less than the threshold distance or a determination by the mobile device that a change in a signal quality metric of the mobile device exceeds a threshold value.

41. The apparatus of claim 39, wherein the calculated ranging measurement comprises at least one of a timing offset measurement, a transmission power measurement, and a frequency offset measurement.

42. A method comprising:
receiving a ranging procedure request from a mobile device, the ranging procedure request transmitted based on a determination that a change in location of the mobile device exceeds a threshold distance;
calculating ranging measurements; and
transmitting a ranging procedure response to the mobile device, wherein the response comprises calculated ranging measurements associated with the mobile device; and wherein the calculated ranging measurements are used by the mobile device to determine whether to bypass a subsequent scheduled ranging procedure.

43. The method of claim 42, further comprising receiving the ranging procedure request based on a determination by the mobile device that the change in location of the mobile device is less than the threshold distance or a determination by the mobile device that a change in a signal quality metric of the mobile device exceeds a threshold value.

\* \* \* \* \*